(12) United States Patent
Herring, III et al.

(10) Patent No.: US 12,326,893 B1
(45) Date of Patent: Jun. 10, 2025

(54) DATA ITEM MATCHING (71) Applicant: Sage Global Services Limited, Newcastle upon Tyne (GB)

(72) Inventors: Robert Hartwell Herring, III, Marietta, GA (US); Anne Sylvia Amaladoss, Mountain House, CA (US)

( * ) Notice: Subject to any disclaimer, the term of this patent is extended or adjusted under 35 U.S.C. 154(b) by 0 days.

(21) Appl. No.: 18/651,938

(22) Filed: May 1, 2024

(51) Int. Cl.
*G06F 16/33* (2025.01)
*G06F 16/334* (2025.01)
*G06F 16/35* (2019.01)

(52) U.S. Cl.
CPC .......... *G06F 16/35* (2019.01); *G06F 16/3347* (2019.01)

(58) Field of Classification Search
CPC .............................. G06F 16/35; G06F 16/3347
See application file for complete search history.

(56) References Cited

U.S. PATENT DOCUMENTS 11,501,067 B1 * 11/2022 Naghshnejad ........ G06F 40/284
11,907,657 B1 *  2/2024 Kang ................... G06F 40/284

* cited by examiner

*Primary Examiner* — Loc Tran
(74) *Attorney, Agent, or Firm* — Barclay Damon LLP; Daniel McGrath (57) ABSTRACT

A computer implemented method of determining which stored data items are most similar to a received data item. For each stored data item, first and second vectors are generated and compared to generate a similarity score. Stored data items are classified as similar to the received data item using the similarity scores. The vectors are defined within the same vector space. The first vector includes a first component indicative of a number of unique N-grams of the received data item relative to the stored data item and a further component indicative of a number of common N-grams in the received data item and the stored data item. The second vector includes first component indicative of a number of unique N-grams of the stored data item, and a further component indicative of a number of common N-grams in the received data item and the stored data item.

13 Claims, 5 Drawing Sheets

| APPLE | AP | PP | PL | LE | | | | | 101 |
|---|---|---|---|---|---|---|---|---|---|
| PINEAPPLE | PI | IN | NE | EA | AP | PP | PL | LE | 102 |

Fig 1a

| All N-Grams | PI | IN | NE | EA | AP | PP | PL | LE | 103 |
|---|---|---|---|---|---|---|---|---|---|
| APPLE Vector | 0 | 0 | 0 | 0 | 1 | 1 | 1 | 1 | 104 |
| PINEAPPLE Vector | 1 | 1 | 1 | 1 | 1 | 1 | 1 | 1 | 105 |

DATA ITEM MATCHING

TECHNICAL FIELD

The present invention relates to techniques for matching data items such as, but not exclusively, data items comprising text.

BACKGROUND

In the field of data analysis, determining the degree of similarity between datasets is important for a wide range of applications. One common method for assessing similarity, especially in textual data, involves the use of "N-grams". N-grams, which are continuous sequences of 'n' items, such as words or letters, from a given sample of text, are used for constructing vectors that represent the text samples. By creating such vectors and then calculating a numerical similarity value between the vectors, it is possible to quantify the similarity between different texts.

Figure 1A:
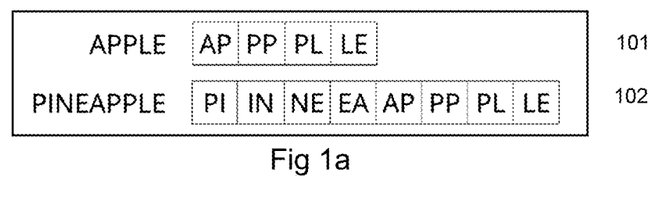
FIG. 1a depicts an example of two sequences of N-grams derived from two texts.

A simple example is explained with reference to FIGS. 1a and 1b. FIG. 1a shows a 2-gram representation 101 of the word "APPLE" and a 2-gram representation 102 of the word "PINEAPPLE".

Figure 1B:
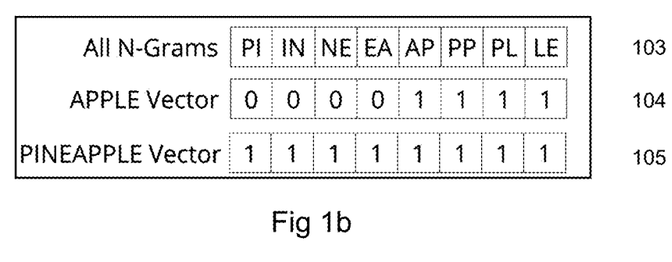
FIG. 1b depicts an example of two vectors associated with the two texts derived from a vector space defined by the two sequences of N-grams.

FIG. 1b depicts how the 2-grams of these words are then combined to form an N-gram vector space 103. A vector 104 for the word "APPLE" and a vector 105 for the word "PINEAPPLE" can then be produced. Once these vectors have been produced, their numerical similarity can be calculated. For example, the Cosine similarity can then be calculated by taking a dot product of the 2 vectors and dividing by the product of magnitude of both vectors:

$$\text{Cosine Similarity} = \frac{A \cdot B}{\|A\|\|B\|}$$

The more similar the words, the higher the similarity score.

The application of N-gram analysis extends across multiple domains, including but not limited to, entity matching, address comparison and data deduplication. For instance, in entity matching, the technique enables the identification of records that refer to the same entity across different databases. In data deduplication, it helps in identifying and removing duplicate or near-duplicate entries within a dataset, ensuring that each piece of information is unique and reducing redundancy.

However, this traditional approach encounters a significant limitation when applied to lengthy texts. The computational resources required to generate and compare N-grams increase substantially with the length of the text, resulting in prolonged computation times. This challenge is particularly acute in scenarios that demand real-time or near real-time text comparison. Examples include systems designed to match user input against a vast repository of stored data, where delays in processing can hinder user experience and system efficiency.

This computational inefficiency poses a barrier to the broader application of N-gram analysis, especially in settings where speed and/or computational efficiency are paramount. Consequently, there is a need for an improved method that can offer the benefits of N-gram based text comparison without the associated computational drawbacks, particularly for lengthy texts.

SUMMARY OF THE INVENTION

In accordance with a first aspect of the invention, there is provided a computer implemented method of determining which of a plurality of stored data items are most similar to a received data item. The method comprises, for each stored data item: generating a first vector; generating a second vector; comparing the first vector and the second vector to generate a similarity score and classifying one or more stored data items as being similar to the received data item in accordance with the generated similarity scores. The first vector and second vector are defined within the same vector space. Generating the first vector comprises generating a first component indicative of a number of unique N-grams of the received data item relative to the stored data item, and a further component indicative of a number of common N-grams in the received data item and the stored data item. Generating the second vector comprises generating a first component indicative of a number of unique N-grams of the stored data item, and a further component indicative of a number of common N-grams in the received data item and the stored data item.

Optionally, the method further comprises generating classification data indicative of the one or more stored data items classified as being similar to the received data item.

Optionally, the first component of the first vector is a first integer count value of the number of unique N-grams in the received data item relative to the stored data item, and the further component of the first vector is a further integer count value of the number of common N-grams in the received data item and the stored data item, and the first component of the second vector is a first integer count value of the number of unique N-grams in the stored data item relative to the received data item, and the further component of the second vector is the integer count value of the number of common N-grams in the received data item and the stored data item.

Optionally, the first vector comprises: the first vector comprises a first 3-component vector ordered as: the first component of the first vector; a null value, and the further component of the first vector, and the second vector comprises a second 3-component vector ordered as a null value; the first component of the second vector and the further component of the second vector.

Optionally, comparing the first vector and the second vector to generate a similarity score comprises applying a cosine similarity function to the first vector and second vector.

Optionally, the N-grams are 2-grams.

Optionally, the stored data items and received data items comprise text data.

In accordance with a second aspect of the invention, there is provided a computer implemented data item matching engine for determining which a plurality of stored data items are most similar to a received data item. The data item matching engine is configured to receive a data item and then, for each of a plurality of stored data items: generate a first vector; generate a second vector; compare the first vector and the second vector to generate a similarity score, and then classify one or more stored data items as being similar to the received data item in accordance with the generated similarity scores. The first vector and second vector are defined within the same vector space. The computer implemented data item matching engine is configured to: generate the first vector by generating a first component indicative of a number of unique N-grams of the received data item relative to the stored data item, and a further component indicative of a number of common N-grams in the received data item and the stored data item, and generate the second vector by generating a first component indicative of a number of unique N-grams of the stored data item, and a further component indicative of a number of common N-grams in the received data item and the stored data item.

Optionally, the data item matching engine is further configured to generate classification data indicative of the one or more stored data items classified as being similar to the received data item.

Optionally, the first component of the first vector is a first integer count value of the number of unique N-grams in the received data item relative to the stored data item, and the further component of the first vector is a further integer count value of the number of common N-grams in the received data item and the stored data item, and the first component of the second vector is a first integer count value of the number of unique N-grams in the stored data item relative to the received data item, and the further component of the second vector is the integer count value of the number of common N-grams in the received data item and the stored data item.

Optionally, the first vector comprises a first 3-component vector ordered as: the first component of the first vector; a null value, and the further component of the first vector, and the second vector comprises a second 3-component vector ordered as a null value; the first component of the second vector and the further component of the second vector.

Optionally, the computer implemented data item matching engine is configured to compare the first vector and the second vector to generate a similarity score by applying a cosine similarity function to the first vector and second vector.

Optionally, the N-grams are 2-grams.

Optionally, the stored data items and received data items comprise text data.

In accordance with a third aspect of the invention, there is provided a computer system comprising a first computing device or system on which is running a computer implemented data item matching engine according to the second aspect, data storage on which is stored a plurality of data items and one or more further computing devices or systems, wherein the first computing device or system is configured to receive data items from the one or more further computing devices or systems, and the computer implemented data item matching engine running on the first computing device or system is configured to classify which of the plurality of stored data items are most similar to the one or more received data items.

Optionally, the data item matching engine is configured to generate classification data indicative of the one or more stored data items classified as being similar to the received data items and output the classification data to the one or more further computing devices from which the data item was received.

In accordance with a fourth aspect of the invention there is provided a computer program which when implemented on a suitably programmed computing system, controls the computer system to perform a method according to the first aspect.

In conventional N-gram-based matching techniques, sequences of N-grams to be analysed are converted into a multi-dimensional vector space and the resulting vectors compared using a numerical comparison operation such as a cosine similarity function.

However, this technique requires that the number of dimensions of the vector space matches the total number of N-grams present in the sequences being analysed.

Consequently, increasingly larger sequences of N-grams (arising from longer text strings for example) result in an increasingly higher dimensional vector space and thus higher dimensional vectors. The higher the dimensionality of the vectors, the more computationally demanding undertaking the numerical comparison becomes.

In accordance with certain examples of the present invention, an N-gram sequence comparison technique is provided for comparing N-gram sequences.

A vector space is defined which comprises a dimension associated with the number of unique N-grams in the first N-gram sequence, a dimension associated with the number of unique N-grams in the second N-gram sequence, and a dimension associated with the number of common N-grams.

A vector in this vector space is then generated for each N-gram sequence. Specifically, for the first N-gram sequence, a first vector is generated which comprises a component indicative of the number of unique N-grams in the first N-gram sequence and a further component indicative of the total number of common N-grams. Similarly, for the second N-gram sequence, a second vector is generated which comprises a component indicative of the number of unique N-grams in the first N-gram sequence and a further component indicative of the total number of common N-grams.

These two vectors can then be input to a numerical similarity function (for example a cosine similarity function) to generate a similarity score quantitively indicative of how similar the received data item and stored data item are to each other.

The vector space used for this comparison is very low dimension (typically 3-dimensions) which is considerably smaller than the vector space used for conventional N-gram comparison operations. Consequently, execution of the similarity function is considerably less resource intensive. This makes the technique particularly appropriate in settings that involve real-time or near real-time text comparison because it allows for faster and more efficient processing of text data, enabling more immediate feedback or results.

Various aspects and features of the invention are defined in the claims.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION

Figure 2:
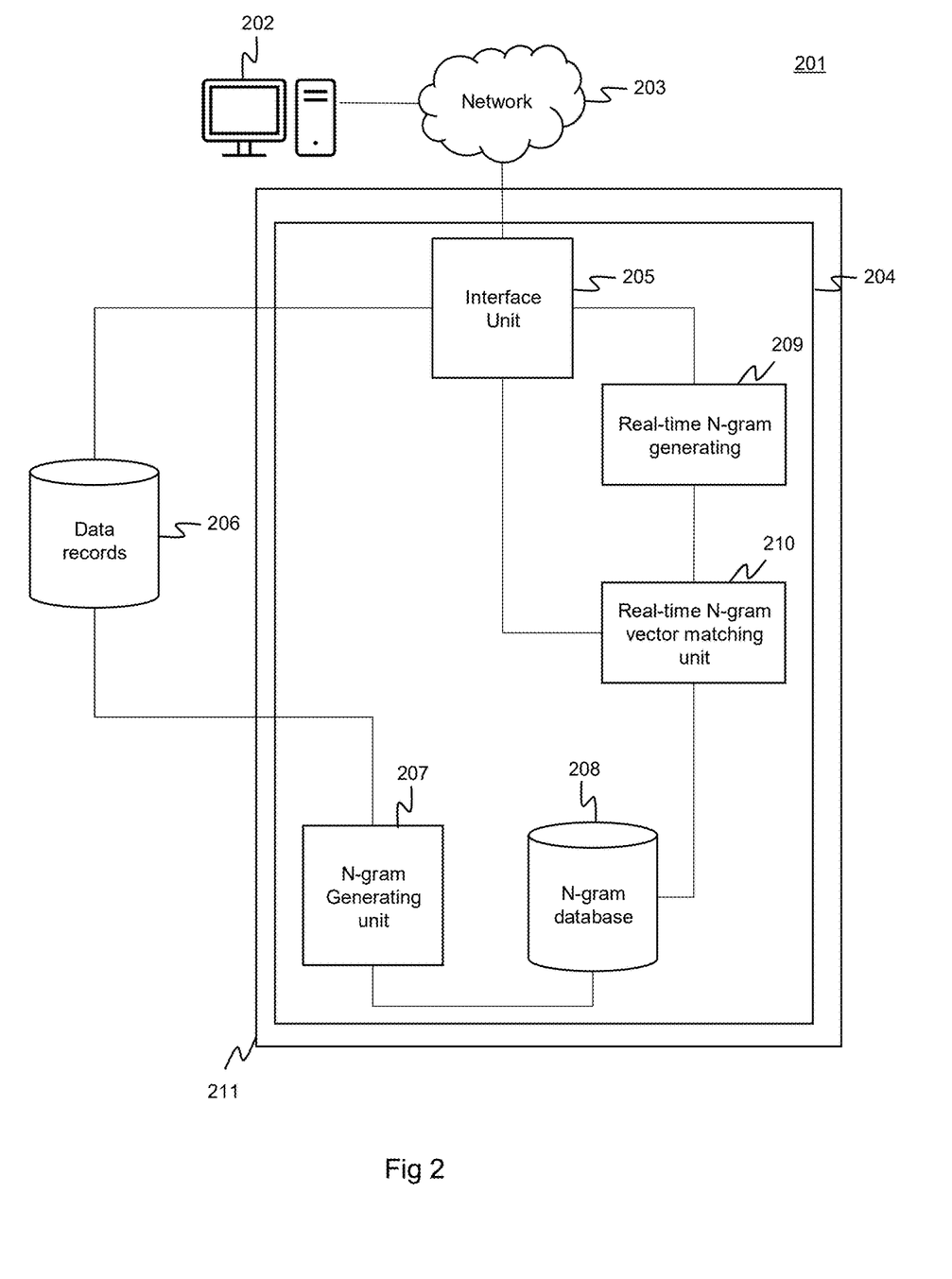
FIG. 2 provides a simplified schematic diagram depicting a system arranged in accordance with certain embodiments of the invention.

FIG. 2 provides a simplified schematic diagram depicting a system 201 for implementing an example of a technique for identifying with improved computational efficiency, which one or more of a plurality of stored data items are most similar to a received data item in accordance with certain embodiments of the invention.

In this example, the system 201 is configured to classify which stored data records (stored data items) correspond most closely (are most similar to) input data received from a user (a received data item). In a typical application of the technique, the user input data is information input by a user to an interface of a user device, which reflects the user's attempt to accurately recall or otherwise accurately identify a specific data record, such as an identifier like the name of a company.

By determining which stored data records most closely match the user input data, suggestions can then be presented to the user on the user device interface comprising one or more stored data records which most closely match the data they have input. This enhances efficiency, allowing users to receive accurate suggestions even if their input is not perfectly accurate, and it makes the system more tolerant to input errors, such as typographical errors, ensuring reliable performance even when user input is imprecise.

The system 201 may be employed to facilitate enhanced data entry assistance as part of a larger software system for providing data processing services to users, for example accounting data processing services.

The system 201 comprises a user device 202 communicatively connected via a data network 203 to a data item matching engine 204. The data item matching engine 204 is typically provided by a software system running on a suitable computing system 211 provided, for example, by an application server. As the skilled person will understand, these components can be provided in any suitable way. For example, the user device 202 can be provided by a smartphone, tablet, personal computer, laptop, or smart wearable. The data network 203 can be provided by the Internet, local area networks (LANs), wide area networks (WANs), and cellular networks such as 4G LTE and 5G. The computing device 211 for the data item matching engine 204 can be provided by one or more traditional servers, cloud-based servers, virtual servers, or distributed computing platforms.

The data item matching engine 204 comprises an interface unit 205, a first N-gram-sequence generating unit 207, and an N-gram database 208. Both the interface unit 205 and the first N-gram-sequence generating unit 207 of the data item matching engine 204 are connected to a data records database 206.

The interface unit 205 is further connected to a real-time N-gram sequence generating unit 209. Both the N-gram sequence database 208 and the real-time N-gram sequence generating unit 209 are connected to a real-time vector generating and matching unit 210. The real-time vector generating and matching unit 210 is also connected to the interface unit 205.

In the illustrative example in which the data records are representative of company names which are to be compared to user input data corresponding to an attempt to identify a specific company name, the data records database 206 has stored thereon a plurality of company-name data records.

As an initial step, typically before user input data is processed, the data records stored in the data records database 206 (for example company-name data records) are converted into N-gram sequences.

Specifically, the first N-gram-sequence generating unit 207 processes each data record stored in the data records database 206. For each data record, the first N-gram-sequence generating unit 207 generates an N-gram sequence which is output and then stored in the N-gram sequence database 208.

Figure 4A:
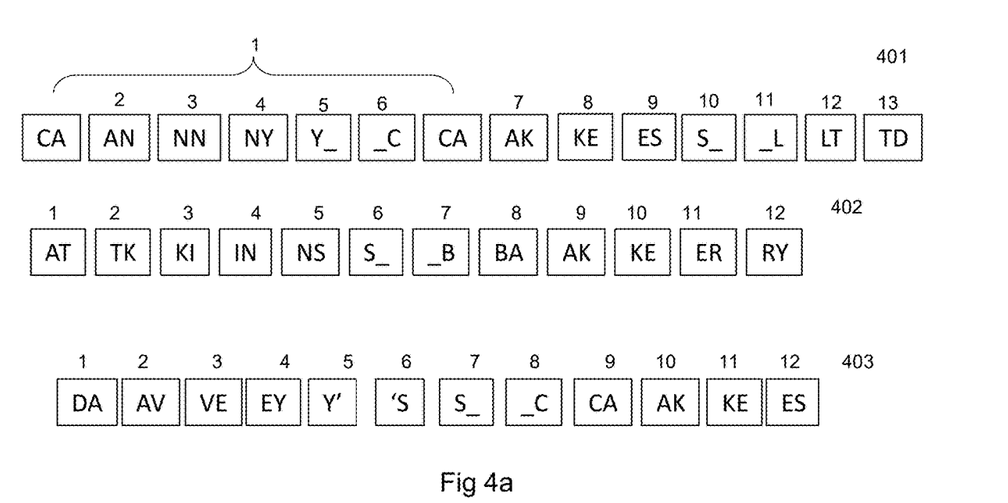
FIG. 4a depicts three sequences of N-grams associated with stored data items in relation to an example of a technique in accordance with certain embodiments of the invention.

To illustrate thus concept, FIG. 4a depicts three example N-gram sequences, each corresponding to a company-name data record (each being a text string in this example).

FIG. 4a shows a first 2-gram sequence 401 corresponding to a company name: CANNY CAKES LTD"; a second 2-gram sequence 402 corresponding to a company name "ATKINS BAKERY", and a third 2-gram sequence 403 corresponding to a company name "DAVEY'S CAKES".

As can be seen, from FIG. 4a, each text string is transformed into a sequence of 2-grams which are formed by overlapping pairs of adjacent characters, starting from the beginning of the text string. Each subsequent 2-gram is created by shifting one character to the right, including spaces to preserve the structure of the original text. Thus, for example, the text string 'CANNY CAKES LTD' is converted into the first 2-gram sequence 401 comprising a sequence of 14 2-grams: [CA]; [AN]; [NN]; [NY]; [Y_]; [_C]; [CA]; [AK]; [KE]; [ES]; [S_]; [_L]; [LT]; [TD](as shown in FIG. 4a, there are 13 unique 2-grams in this sequence, as the 2-gram "[CA]" appears twice); the text string 'ATKINS BAKERY' is converted into the second 2-gram sequence 402 comprising a sequence of 12 2-grams: [AT]; [TK]; [KI]; [IN]; [NS]; [S_]; [_B]; [BA]; [AK]; [KE]; [ER]; [RY]; and the text string 'DAVEY'S CAKES' is converted into the third 2-gram sequence 403 comprising a sequence of 12 2-grams: [DA]; [AV]; [VE]; [EY]; [Y']; ['S]; [S_]; [_C]; [CA]; [AK]; [KE]; [ES].

Each N-gram sequence generated in this way is stored in the N-gram sequence database 208. In this way, the N-gram sequence database 208 comprises a plurality of data-record N-gram sequences, each of which correspond to one of the data records stored in the data records database 206.

Figure 3:
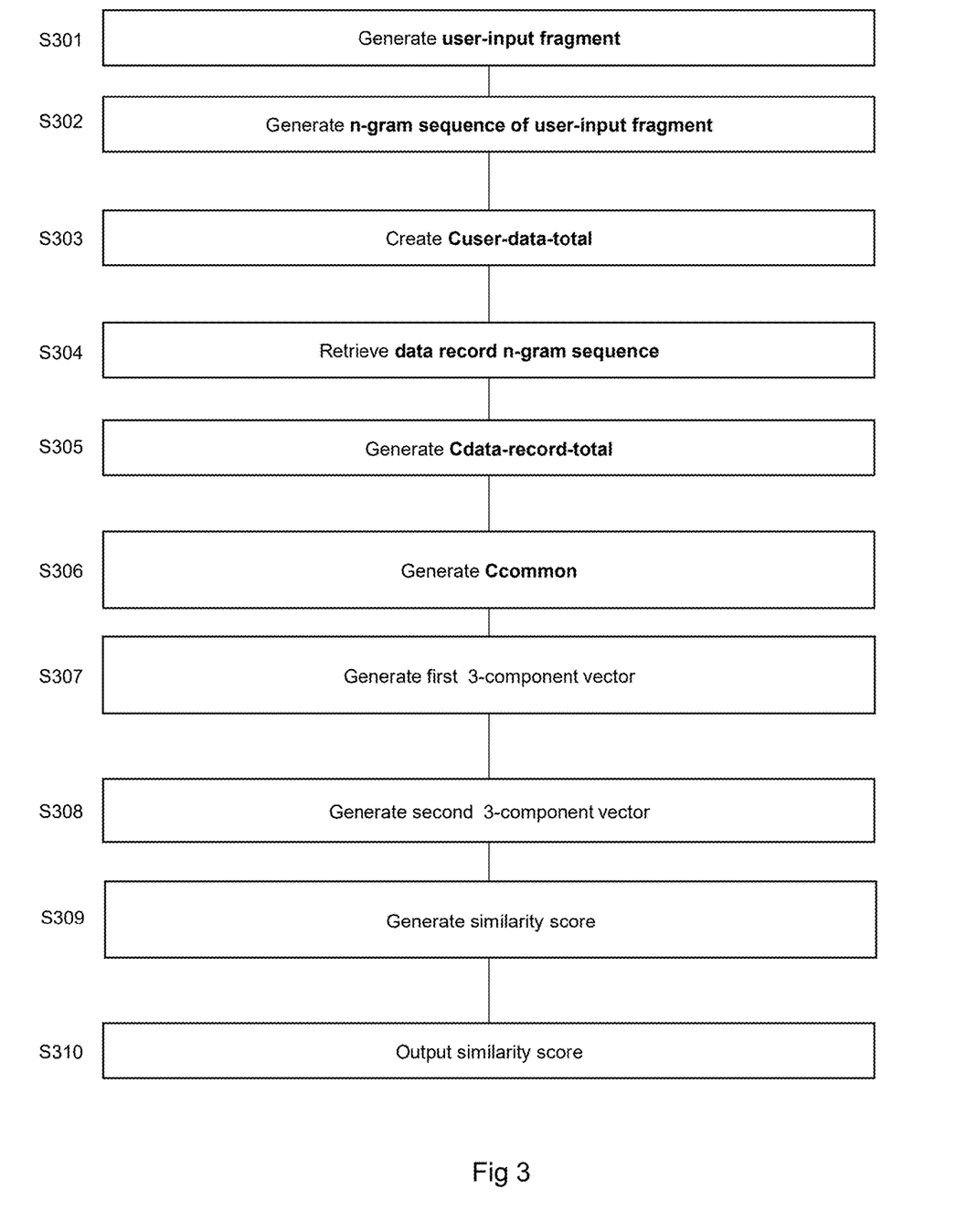
FIG. 3 provides a flow chart depicting steps of a process for generating a similarity score for a user data item and a stored data item.

Operation of the system 201 to classify which stored data records correspond most closely input data received from a user will now be explained further with reference to the flow chart shown in FIG. 3 and the example company-name data records and associated 2-gram sequences described with reference to FIG. 4a.

Initially, a user of the user device 202 begins entering text data of a company name. As text data is entered it is communicated from the user device 202 via the data network 203 to the data item matching engine 204 and specifically the interface unit 205.

Once a sufficient amount of text data has been received (for example a predetermined number of text characters) for the system to attempt to identify one or more of the stored data records, at a first step S301, the interface unit 205 generates a user-input fragment which comprises the text data so-far received from the user device 202.

In an illustrative example, this user-input fragment comprises the text string "CANYCAKE".

Figure 4B:
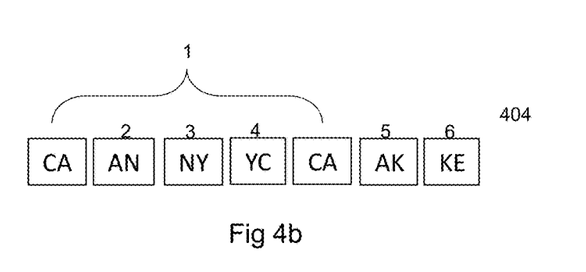
FIG. 4b depicts a sequence of N-grams associated with a user data item in relation to an example of a technique in accordance with certain embodiments of the invention.

The interface unit 205 then passes this received data item, i.e. the user-input fragment, to the real-time N-gram sequence generating unit 209 which, at a second step S302, generates a 2-gram sequence of the user-input fragment. An example of this is depicted in FIG. 4b. As can be seen from FIG. 4b, a 2-gram sequence 404 of the user-input fragment "CANYCAKE" comprises a sequence of seven 2-grams: [CA]; [AN]; [NY]; [YC]; [CA]; [AK]; [KE]. As shown in FIG. 4a, there are six unique 2-grams in this sequence, as the 2-gram "[CA]" appears twice.

The user-input fragment N-gram sequence is then communicated from the real-time N-gram sequence generating unit 209 to the real-time vector generating and matching unit 210.

The following steps of the process comprise the real-time vector generating and matching unit 210 combining numerical properties of the user-input fragment N-gram sequence with those of each data-record N-gram sequence, to generate, for each data-record N-gram sequence, a pair vectors in a specially selected low-dimension vector space, and then comparing the vector pair to generate a similarity score to quantitatively determine the similarity between the user-input fragment and each stored data record.

The low-dimension vector space comprises a dimension associated with the number of unique N-grams in the user-input fragment N-gram sequence; a dimension associated with the number of unique N-grams in the data-record N-gram sequence, and a dimension associated with the number of common N-grams between these N-gram sequences. Consequently, the vector space typically comprises three dimensions, although a greater number of dimensions is possible, for example to capture further numerical properties of the N-grams that may be relevant for comparison operations.

Based on this vector space, the first vector of the pair of vectors comprises a first component indicative of the number N-grams in the user-input fragment N-gram sequence that are unique relative to the data-record N-gram sequence (i.e. that appear in the user-input fragment N-gram sequence but not in the data-record N-gram sequence), and a second component indicative of the number of N-grams that are common between the user-input fragment N-gram sequence and the data-record N-gram sequence.

Correspondingly, the second vector of the pair of vectors comprises a first component indicative of the number N-grams in the data-record N-gram sequence that are unique relative to the user-input fragment N-gram sequence (i.e. that appear in the data-record N-gram sequence but not in the user-input fragment N-gram sequence sequence), and a second component indicative of the number of N-grams that are common between the user-input fragment N-gram sequence and the data-record N-gram sequence.

As mentioned above, these two vectors are then compared to generate a numerical similarity score. When this comparison operation has been performed for all the data-record N-gram sequences, the data record (or records) (for example company name or names) that are most similar to the user-input fragment can be classified as such. Once this classification has been conducted, further suitable steps can be undertaken depending on the setting. For example, suitable classification data can be generated.

Accordingly, vector generating functionality implemented by the real-time vector generating and matching unit 210 is configured to perform operations on each N-gram sequence to determine the number of unique n-grams in a given sequence and to determine the number of common N-grams between two sequences of N-grams. As the skilled person will understand, this can be achieved using any suitable combination of computing operations. An example is described in the following steps of FIG. 3.

Returning to FIG. 3, at a third step S303, the real-time vector generating and matching unit 210 generates a integer count value, $C_{user\text{-}data\text{-}total}$ of the total number of unique N-grams in the user-input fragment N-gram sequence.

As can be seen from FIG. 4b, for the example 2-gram sequence 404 of the user-input fragment "CANYCAKE", the integer count value of unique N-grams, $C_{user\text{-}data\text{-}total}$ is 6.

At a fourth step S304, the real-time vector generating and matching unit 210 retrieves the first data-record N-gram sequence from the n-gram sequence database 208.

At a fifth step, S305 the real-time vector generating and matching unit 210 generates a integer count value, $C_{data\text{-}record\text{-}total}$ of the total number of unique N-grams in the data-record N-gram sequence.

As can be seen from FIG. 4a, for the example 2-gram sequence 401 of the first data record for the company name "CANNY CAKES LTD", the integer count value of unique N-grams, $C_{data\text{-}record\text{-}total}$ is 13.

At a sixth step S306, the real-time vector generating and matching unit 210 undertakes a process to calculate a integer count value, $C_{common}$ of the total number of the N-grams that are common to both the user-input fragment N-gram sequence and the data-record N-gram sequence. Any suitable technique can be used here. For example, the python ".intersection( )" method.

Figure 4C:
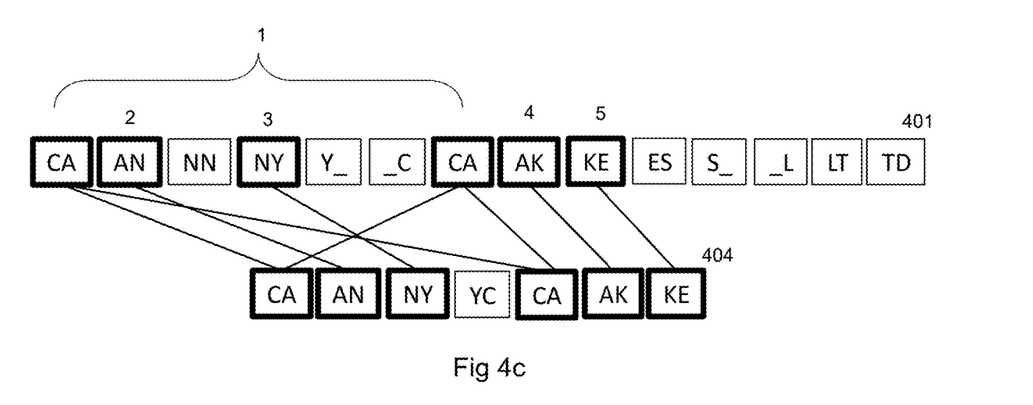
FIG. 4c depicts common N-grams between one of the sequences of N-grams associated with stored data items shown in FIG. 4a and the sequence of N-grams associated with a user data item shown in FIG. 4b, and FIG. 5 provides a simplified schematic diagram depicting a system incorporating a data item matching engine in accordance with certain embodiments of the invention.

As can be seen in FIG. 4c, by comparing the 2-gram sequence 402 of the second data record of the company name "CANNY CAKES LTD" and the 2-gram sequence 404 of the user-input fragment "CANYCAKE", this integer count value, $C_{common}$ is five because the 2-grams [CA]; [AN]; [NY][AK], and [KE] are common to both the 2-gram sequence 401 of the first data record and the 2-gram sequence 404 of the user-input fragment.

At a seventh step S307, the real-time vector generating and matching unit 210 generates the first 3-component vector.

The first component of the vector is the total number of N-grams in the user-input fragment N-gram sequence that are unique to the user-input fragment N-gram sequence relative to the data-record N-gram sequence. This value can be calculated by simply subtracting the integer count value, $C_{common}$ of the total number of common N-grams generated at the seventh step S207 from the integer count value, $C_{user\text{-}data\text{-}total}$ of the total number of unique N-grams in the user-input fragment N-gram sequence calculated at the third step S303.

For the 2-gram sequence 401 of the first data record shown in FIGS. 4a and 4c and the 2-gram sequence 404 of the user-input fragment shown in FIGS. 4b and 4c, the integer count value, $C_{common}$ of the total number of common N-grams generated at the seventh step S207 is five, and the integer count value, $C_{user\text{-}data\text{-}total}$ of the total number of unique N-grams in the user-input fragment N-gram sequence calculated at the third step S303 is six, therefore the subtraction operation would be:

$$6-5=1$$

The second component of the vector is a null value. This is because, in the vector space, the second component relates to the number of N-grams present in the N-gram sequence that are unique to the data-record N-gram sequence which, self-evidently is a null value for the user-input fragment N-gram sequence.

The third component of the vector is the integer count value, $C_{common}$ of the total number of common N-grams generated at the seventh step S207.

Thus for the 2-gram sequence 401 of the first data record shown in FIGS. 4a and 4c and the 2-gram sequence 404 of the user-input fragment shown in FIGS. 4b and 4c, this first vector would be:

First vector: [1][0][5]

At an eighth step S308, the real-time vector generating and matching unit 210 generates the second 3-component vector.

The first component of the vector is a null value, because in the vector space, this component relates to the number of N-grams present in the N-gram sequence that are unique to the user-input fragment N-gram sequence which, self-evidently is a null value for the data-record N-gram sequence.

The second component of the vector is the total number of N-grams in the data-record N-gram sequence that are unique to the data-record N-gram sequence relative to the user-input fragment N-gram sequence. This value can be calculated by simply subtracting the integer count value, $C_{common}$ of the total number of common N-grams generated at the seventh step S207 from the integer count value, $C_{data-record-total}$ of the total number of N-grams in the data-record N-gram sequence calculated at the fourth step S304.

For the 2-gram sequence 401 of the first data record shown in FIGS. 4a and 4c and the 2-gram sequence 404 of the user-input fragment shown in FIGS. 4b and 4c, as already stated, the integer count value, $C_{common}$ of the total number of common N-grams generated at the seventh step S207 is five, and the integer count value, $C_{user-data-total}$ of the total number of unique N-grams in the data record N-gram sequence 401 calculated at the fifth step S305 is five, therefore the subtraction operation would be:

$$13-5=8$$

The third component of the vector is the integer count value, $C_{common}$ of the total number of common N-grams generated at the seventh step S207.

Thus for the 2-gram sequence 401 of the first data record shown in FIGS. 4a and 4c and the 2-gram sequence 404 of the user-input fragment shown in FIGS. 4b and 4c, this second vector would therefore be:

Second vector: [0][8][5]

At a ninth step S309, the real-time vector generating and matching unit 210 then generates a similarity score by processing the first vector and second vector in accordance with a suitable function, for example a cosine similarity function.

Performing a cosine similarity function on the first vector: [1][0][5] and second vector: [0][8][5] produces a cosine similarity score of approximately 0.520.

At a tenth step S310, the real-time vector generating and matching unit 210 outputs the similarity score to the interface unit 205.

Steps S204 to S211 are repeated until a similarity score has been generated for all of the data-record N-gram sequences stored in the N-gram sequence database 208.

Once the interface unit 205 has received all of the similarity scores, it is then configured to determine which of the similarity scores are the highest and thereby classify which of the stored data records are most similar to the received user input data.

Using this technique, the 2-gram sequence 404 and the second 2-gram sequence 402 associated with the second company name "ATKINS BAKERY" results in:
 a first vector of: [4][0][2]
 a second vector of [0][10][2],
which together produce a cosine similarity score of approximately:
 0.088.

Similarly, the 2-gram sequence 404 and the third 2-gram sequence 403 associated with the third company name "DAVEY'S CAKES" results in:
 a first vector of: [3][0][3]
 a second vector [0][9][3]
which together produce a cosine similarity score of approximately:
 0.224.

Once this is complete, the interface unit 205 is configured to classify which data record or data records from the data records database 206 are similar to the received user input data.

The process of classifying relevant data records based on similarity scores can be implemented in various ways. For instance, the data record associated with the highest similarity score can be classified as the most similar, and no further classification conducted. Alternatively, the data records associated with the top-ranked similarity scores, such as the top three could be jointly classified as most similar or could be ranked. Alternatively, or additionally, all data records that achieve similarity scores above a predetermined threshold could be classified as being sufficiently similar.

Once the classification has occurred, the interface unit 205 is configured to output classification data to the user device 202.

Typically, this classification data comprises the data record or data records classified as similar to the user input data. Thus, the interface unit 205 retrieves these data records from the data records database 206 and communicates them in a suitable form to the user device 202.

In typical examples, these retrieved data records (for example company names) form a list of one or more candidate data records which can be presented to on the user interface of the user device 202 for user selection based on which data record (if any) match the data record that the user of the system 201 intended to identify by the initial user data.

In the example described above, the similarity score associated with the company name "CANNY CAKES LTD" yielded the highest similarity score (0.520) with the user input of "CANYCAKES". Thus, in this example, the data record of the company name "CANNY CAKES LTD" would be returned from the data item matching engine 204 to the user device 202.

In such an example, once the data record of "CANNY CAKES LTD" is identified by the data item matching engine 204 as the most similar to the user input, it is sent back to the user device 202. Upon receipt, this data is then displayed as a selectable option on the interface of user device 202, enabling the user to confirm the selection.

In the example discussed above, the cosine similarity function is employed to generate a similarity score. However, as the skilled person will understand, alternative numerical techniques can be used for such comparisons such as Euclidean Distance, Manhattan Distance, Pearson Correlation Coefficient, Jaccard Similarity, and Hamming Distance.

Returning to FIG. 2, the user device 202 can be provided by a wide range of devices suitable for interfacing with the system, including but not limited to personal computers (PCs), tablets, smartphones, and laptops. Similarly, the data network 203, while typically the Internet, can extend to any suitable data communication network, encompassing both wired and wireless technologies, such as local area networks (LANs), wide area networks (WANs), or private networks, depending on the specific requirements for data transmission and security. The data item matching engine 204, is typically manifested as a software system configured to operate on any suitable computing system capable of hosting such applications. This includes various server implementations, ranging from dedicated servers to cloud-based servers, and even distributed computing environments.

In certain examples, a data item matching engine in accordance with embodiments of the invention can be usefully incorporated into a larger software system for improving the processing of received data items facilitating, for example, enhancing user data entry.

Figure 5:
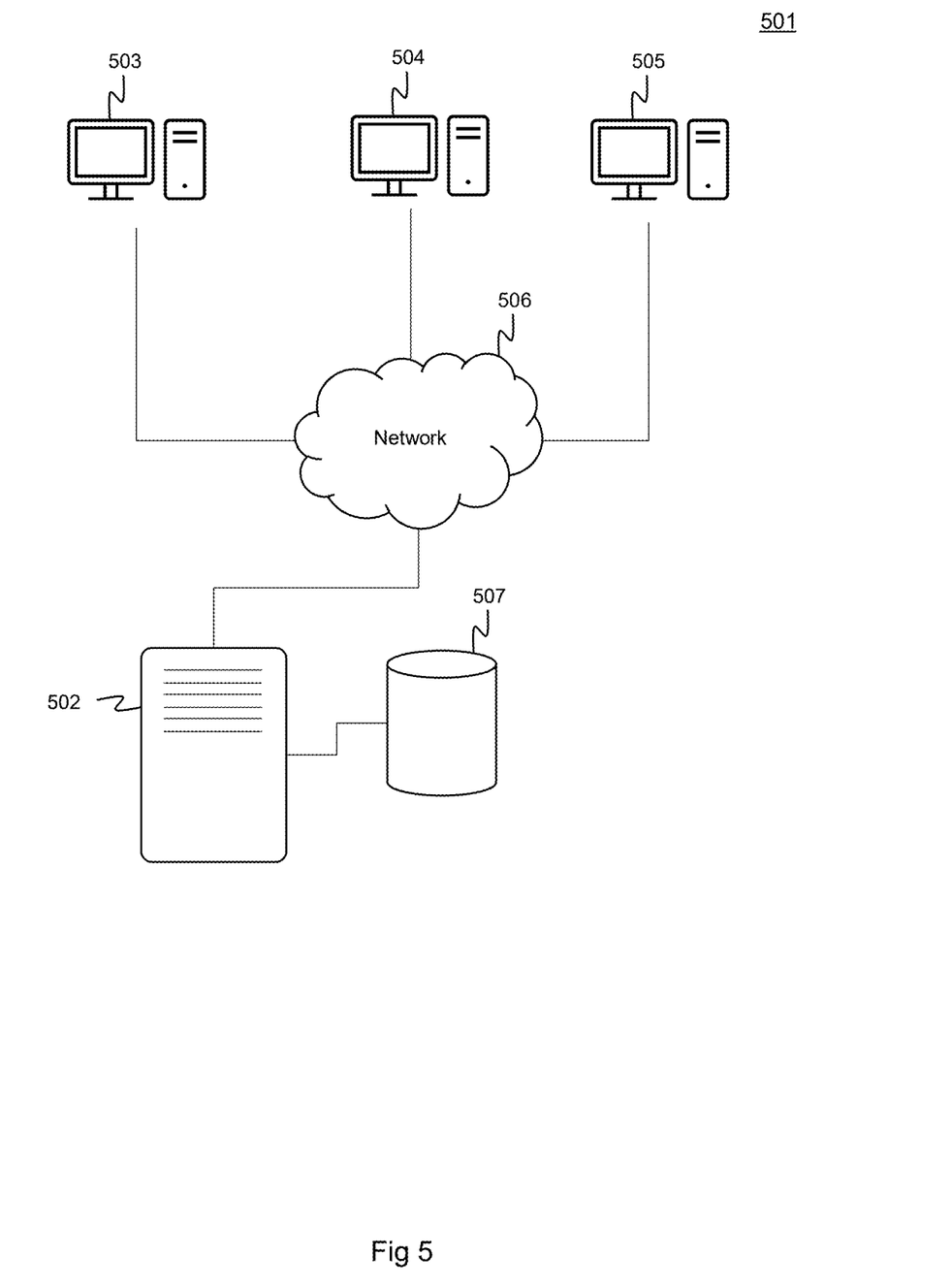

FIG. 5 provides a simplified schematic diagram of a system 501 in accordance with such an example. FIG. 5 depicts an application server 502 hosting a software platform for providing accounting services to a plurality of users. Users access these services via web browser software running on one of a plurality of user devices 503, 504, 505 which are connected to the application server 502 via a data network 506. The application server 502 is connected to an application database 507 on which data associated with the software platform is stored, including a data records database. As the skilled person will understand, the components of the system 501 can be implemented in any suitable way. For example, the application server 502 can be implemented using single or distributed server configurations, including virtual servers or cloud-based solutions such as cloud computing platforms like Amazon Web Services or Microsoft Azure. User devices 503, 504, 505 can include a wide range of devices such as PCs, tablets, smartphones, wearables like VR headsets and smartwatches, and other IoT devices, all capable of running web browser software. These user devices 503, 504, 505 are connected to the application server 502 via the data network 506, which can be the Internet, intranets, or mobile data networks, and may employ various connection methods including wired (Ethernet), wireless (Wi-Fi, Bluetooth), or mobile data connections (3G, 4G, 5G). The application database 507 can be based on on-premise databases, cloud-based databases, or distributed databases.

The software platform running on the application server 502 comprises functionality providing a data item matching engine of the type described above.

In use, users input data to the user devices 503, 504, 505 via the web browser software. For example, for an invoice generating service provided by the software platform, a user may begin to type the name of a company to whom an invoice is to be sent. As the user inputs this information (for example by typing), corresponding input data is communicated to the software platform running on the application server and passed to the data item matching engine. As described above, a corresponding user-input fragment is generated and processed in accordance with steps of the process depicted in FIG. 3, to identify which company name data record, stored in a data records database stored on the application database 507 matches the user-input fragment most closely. A data record, thus identified, is communicated back to the user device from which the input data is received, and presented as a suggestion on a web browser interface. The user can then confirm if this suggestion is correct and if so, for example, the relevant field of an invoice generating interface can be filled with the relevant company name details.

As the skilled person will understand, a data item matching engine in accordance with examples of the invention can be implemented in any suitable way. As described with reference to the example of FIG. 5, such a data item matching engine can be incorporated in a larger software system. However, where appropriate, such a data item matching engine could be implemented as a standalone application or software module. Additionally, such a data item matching engine could be integrated within an embedded system for dedicated hardware environments, provided as a cloud-based service for scalability and remote access, or deployed as a mobile application for on-the-go data matching. Further, such a data item matching engine could be part of a larger application programming interface (API), implemented in hardware such as ASICs or FPGAs for high-speed data processing, or included as a browser extension for direct use within web browsers. Such a data item matching engine could also be configured as a service within an IoT platform, embedded into device firmware, or offered as a plug-in for existing data management systems. Each of these implementations allows such a data item matching engine to be utilised in various computing environments and platforms, catering to different technical needs and use cases.

In the example described with reference to FIG. 2, the data item matching engine 204 comprises an interface unit 205, a first N-gram-sequence generating unit 207 for converting stored data items into N-gram sequences, an N-gram database 208 where these N-gram sequences are stored; a real-time N-gram sequence generating unit 209 for converting a received data item into an N-gram sequence and a real-time vector generating and matching unit 210 for comparing the N-gram sequence of the received data item with the N-gram sequences associated with the stored data items and for outputting a similarity score allowing the most similar stored data items to be identified.

The skilled person will understand that this is one example of providing a group of functional units for implementing the method described with reference to FIG. 3 in a data item matching unit, however in other embodiments the functionality associated with these functional units could be combined or arranged differently.

In the examples described above, the received data item is user input data received from a user via a user device. However, in other implementations, the received data item may be received from alternative sources, in particular any other suitable computing process which may generate data items to be compared with stored data items. Data item matching engines in accordance with embodiments of the invention can be implemented in any suitable settings where n-grams are appropriate for comparing received data items with stored data items. This includes, but is not limited to, web log data in settings for analysing user behaviour patterns, language phonemes for speech recognition applications, keyboard strokes for cybersecurity authentication, musical notes for music analysis and genre classification, time series data for forecasting in finance and meteorology, sensor data for predictive maintenance in industrial applications, image pixels for pattern recognition in digital image processing, binary data for malware detection and network traffic analysis, and even genomic data for genetic research and diagnostics.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:

1. A computer implemented method of determining which of a plurality of stored data items are most similar to a received data item, said method comprising, for each stored data item:
   generating a first vector;
   generating a second vector;
   comparing the first vector and the second vector to generate a similarity score;
   classifying one or more stored data items as being similar to the received data item in accordance with the generated similarity scores, wherein the first vector and second vector are defined within the same vector space;
   generating the first vector comprises generating a first component indicative of a number of unique N-grams of the received data item relative to the stored data item, and a further component indicative of a number of common N-grams in the received data item and the stored data item, wherein the first component of the first vector is a first integer count value of the number of unique N-grams in the received data item relative to the stored data item, and the further component of the first vector is a further integer count value of the number of common N-grams in the received data item and the stored data item, and the first vector comprises a first 3-component vector ordered as: the first component of the first vector, a null value, and the further component of the first vector;
   generating the second vector comprises generating a first component indicative of a number of unique N-grams of the stored data item, and a further component indicative of a number of common N-grams in the received data item and the stored data item, wherein the first component of the second vector is a first integer count value of the number of unique N-grams in the stored data item relative to the received data item, and the further component of the second vector is the integer count value of the number of common N-grams in the received data item and the stored data item, and the second vector comprises a second 3-component vector ordered as a null value, the first component of the second vector and the further component of the second vector.

2. A method according to claim 1, further comprising generating classification data indicative of the one or more stored data items classified as being similar to the received data item.

3. A method according to claim 1, wherein comparing the first vector and the second vector to generate a similarity score comprises applying a cosine similarity function to the first vector and second vector.

4. A method according to claim 1, wherein the N-grams are 2-grams.

5. A method according to claim 1, wherein the stored data items and received data items comprise text data.

6. A computer implemented data item matching system comprising at least one processor, for determining which a plurality of stored data items is most similar to a received data item, the at least one processor configured to receive a data item and then, for each of a plurality of stored data items, the at least one processor is configured to:
   generate a first vector;
   generate a second vector;
   compare the first vector and the second vector to generate a similarity score, and then classify one or more stored data items as being similar to the received data item in accordance with the generated similarity scores, wherein the first vector and second vector are defined within the same vector space, and the at least one processor is configured to:
   generate the first vector by generating a first component indicative of a number of unique N-grams of the received data item relative to the stored data item, and a further component indicative of a number of common N-grams in the received data item and the stored data item, wherein the first component of the first vector is a first integer count value of the number of unique N-grams in the received data item relative to the stored data item, and the further component of the first vector is a further integer count value of the number of common N-grams in the received data item and the stored data item, and the first vector comprises a first 3-component vector ordered as: the first component of the first vector, a null value, and the further component of the first vector; and generate the second vector by generating a first component indicative of a number of unique N-grams of the stored data item, and a further component indicative of a number of common N-grams in the received data item and the stored data item, wherein the first component of the second vector is a first integer count value of the number of unique N-grams in the stored data item relative to the received data item, and the further component of the second vector is the integer count value of the number of common N-grams in the received data item and the stored data item, and the second vector comprises a second 3-component vector ordered as a null value, the first component of the second vector and the further component of the second vector.

7. A computer implemented data item matching system according to claim 6, wherein the data item matching system is further configured to generate classification data indicative of the one or more stored data items classified as being similar to the received data item.

8. A computer implemented data item matching system according to claim 6, wherein the computer implemented data item matching system is configured to compare the first vector and the second vector to generate a similarity score by applying a cosine similarity function to the first vector and second vector.

9. A computer implemented data item matching system according to claim 6, wherein the N-grams are 2-grams.

10. A computer implemented data item matching system according to claim 6, wherein the stored data items and received data items comprise text data.

11. A computer system comprising the computer implemented data item matching system according to claim 6, and data storage on which is stored a plurality of data items and one or more further computing devices or systems, wherein the computer implemented data item matching system is configured to receive data items from the one or more further computing devices or systems, and the computer implemented data item matching system is configured to classify which of the plurality of stored data items are most similar to the one or more received data items.

12. A computer system according to claim 11, wherein the data item matching system is configured to generate classification data indicative of the one or more stored data items classified as being similar to the received data items and output the classification data to the one or more further computing devices from which the data item was received.

13. A computer program which when implemented on a suitably programmed computing system, controls the computer system to perform a method according to claim 1.

* * * * *